(12) United States Patent
Stover

(10) Patent No.: US 7,040,539 B1
(45) Date of Patent: May 9, 2006

(54) NEGOTIABLE INSTRUMENT WITH FRAUD PROTECTION

(76) Inventor: Merlin Stover, 15674-213th Ave., Spirit Lake, IA (US) 51360

( * ) Notice: Subject to any disclaimer, the term of this patent is extended or adjusted under 35 U.S.C. 154(b) by 0 days.

(21) Appl. No.: 10/696,231

(22) Filed: Oct. 29, 2003

(51) Int. Cl.
G06K 7/10 (2006.01)

(52) U.S. Cl. ............... 235/462.01; 235/379; 235/380

(58) Field of Classification Search .......... 235/462.01, 235/380, 379, 487; 283/70, 74, 77, 58, 57; 382/135–140, 115
See application file for complete search history.

(56) References Cited

U.S. PATENT DOCUMENTS

| | | | |
|---|---|---|---|
| 2,462,735 A * | 2/1949 | Goldwater | 283/77 |
| 3,048,697 A * | 8/1962 | Cavanaugh et al. | 283/70 |
| 4,454,610 A | 6/1984 | Sziklai | |
| 4,865,351 A * | 9/1989 | Smithson et al. | 283/58 |
| 5,326,136 A | 7/1994 | Doyle | |
| 5,355,411 A | 10/1994 | MacDonald | |
| 5,442,162 A * | 8/1995 | Armel | 235/381 |
| 5,504,822 A | 4/1996 | Holt | |
| 5,506,691 A | 4/1996 | Bednar et al. | |
| 5,537,486 A | 7/1996 | Stratigos et al. | |
| 5,544,255 A | 8/1996 | Smithies et al. | |
| 5,559,895 A | 9/1996 | Lee et al. | |
| 5,570,465 A * | 10/1996 | Tsakanikas | 358/1.15 |
| 5,594,226 A | 1/1997 | Steger | |
| 5,657,389 A * | 8/1997 | Houvener | 713/186 |
| 5,838,814 A * | 11/1998 | Moore | 382/115 |
| 5,863,074 A * | 1/1999 | Wilkinson | 283/58 |
| 5,939,699 A * | 8/1999 | Perttunen et al. | 235/462.01 |
| 6,106,020 A * | 8/2000 | Leef et al. | 283/67 |
| 6,212,504 B1 | 4/2001 | Hayosh | |
| 6,390,362 B1 | 5/2002 | Martin | |
| 6,523,741 B1 | 2/2003 | DiMaria et al. | |
| 6,575,362 B1 | 6/2003 | Bator et al. | |
| 6,764,015 B1 * | 7/2004 | Pearson | 235/487 |
| 2002/0040344 A1 | 4/2002 | Preiser et al. | |
| 2002/0065771 A1 | 5/2002 | Dutta | |
| 2002/0071682 A1 * | 6/2002 | Iguchi et al. | 396/564 |
| 2002/0179709 A1 | 12/2002 | Mehler | |
| 2002/0184152 A1 | 12/2002 | Martin | |
| 2003/0056104 A1 | 3/2003 | Carr et al. | |
| 2003/0173406 A1 * | 9/2003 | Bi et al. | 235/491 |

* cited by examiner

Primary Examiner—Michael G. Lee
Assistant Examiner—Kumiko C. Koyama
(74) Attorney, Agent, or Firm—McKee, Voorhees & Sease, P.L.C.

(57) ABSTRACT

A negotiable instrument with fraud protection and method of use is included. The method having the step accepting a negotiable instrument having a pre-printed bar code and photo identification, and a pre-printed signature. The method also having a step reading the bar code on a negotiable instrument and deriving personal identification instrument from the bar code. The method also having the step of comparing the personal identification information from the bar code with information given by the writer. The negotiable instrument with fraud protection has features common to a check, but without having any personal information visible. The negotiable instrument with fraud protection also has a visible photo of the writer pre-printed upon the negotiable instrument, a signature of the writer pre-printed upon the negotiable instrument and a pre-printed bar code hiding personal information about the writer.

5 Claims, 3 Drawing Sheets

NEGOTIABLE INSTRUMENT WITH FRAUD PROTECTION

BACKGROUND OF THE INVENTION

Checks, traveler's checks, and money orders are well known popular methods of payment in retail sales. A check is convenient for the customer to access available funds without carrying cash. In addition, merchants who accept checks increase their revenues because a transaction with checks do not come with the expense of a percentage of the sale going to a credit card company such as Visa, MasterCard, Discover, and American Express.

However, it is well known that customers and merchants are victims of check fraud. Check fraud may be significantly reduced if the person signing the check is accurately determined to be the person authorized to do so. Unfortunately, the prior art checks all have personal information typed upon the face of the check including the name and address of the check writer and therefore this information cannot be asked of the check writer as a security measure. Accordingly, an objective of the present invention is to hide personal information from the face of the check and to replace it with a bar code that hides the information from a would be fraudulent check writer but still permits a merchant who is validating the negotiable instrument to access the information.

Bar codes have been used on checks in the prior art to store information on pre-printed checks. For example, U.S. patent application 2002/0065771A1 to Dutta discloses bar codes used to store an account number. However, this feature does not contribute to the security of the check writer but is primarily an aid in assisting commerce. It does not include the valuable information of the name of the user, the address, a telephone number, or any other personal information.

In addition, some bar codes have been placed upon checks with the same bar code as on a drivers license number as in U.S. Pat. No. 5,594,226 to Steiger. However, this driver's license code only provides the drivers license number, not any personal information that would be readily asked of the check writer such as their name, home address, or telephone number.

Bar codes in the prior art are either two-dimensional (2-D) or one-dimensional (1-D). U.S. Pat. No. 6,575,362 issued to Bator employs a system which uses a 2-D bar code which is printed (not pre-printed) upon a money order which includes information about the money order request, authorization code, and printed information on the money order coupon. Bator uses a technique to generate the label in accordance with the techniques disclosed in Berson U.S. Pat. No. 5,388,158. As described in Berson, a 2-D bar code can currently hold up to 1,800 characters in the area of a postage stamp and may be used to store graphic information. In contrast, 1-D bar codes hold far few characters and are used only for alphanumeric characters, namely a decimal digit or a letter. Bator teaches a method of creating a security label, however, the security label is printed after the checks are formed the money order written and includes information that could not be anticipated at the time the checks were initially printed. In summary, Bator does not solve the problems associated with check fraud identity validation at the time of writing the check. Therefore, a further objective of the present invention is to include a bar code which utilizes a two dimensional bar code which provides meaningful information to the merchant regarding the name, telephone number, address, and photo I.D. of the user.

Finally, a still further feature of the present invention is the inclusion of a bar code on the pre-printed checks which deter people from writing fraudulent checks. Bar codes are generally well known to contain information that is imperceptible to the human observer. The upper left hand corner of the check is a typical area used for personal identification information. Accordingly, a still further feature of the present invention is to effectively locate the bar code to maximize the effect upon the fraudulent check writer that personal identification information is stored within the bar code.

The method and check with fraud protection for accomplishing these and other objectives and features of the present invention will become apparent from the detailed description which follows.

SUMMARY OF THE INVENTION

A method of using a negotiable instrument with fraud protection is provided. The method has a step of accepting a negotiable instrument having a pre-printed bar code, a photo identification, and a pre-printed signature. The method also has the step reading the bar code on the negotiable instrument and deriving personal identification information from the bar code. The method then has the validation steps of comparing the personal identification information from the bar code with information provided by the user, comparing the photo identification upon the negotiable instrument to the writer, and comparing the pre-printed signature upon the negotiable instrument to a signature provided by the writer upon the negotiable instrument.

There is no personal information visible upon the negotiable instrument. The negotiable instrument has a visible photo of a writer pre-printed upon the negotiable instrument. The negotiable instrument also has a signature of the writer pre-printed upon it for comparison of a legal signature provided by the writer. In addition, the negotiable instrument with fraud protection has a pre-printed bar code hiding personal information about the writer.

DETAILED DESCRIPTION OF THE PREFERRED EMBODIMENT

Figure 1:
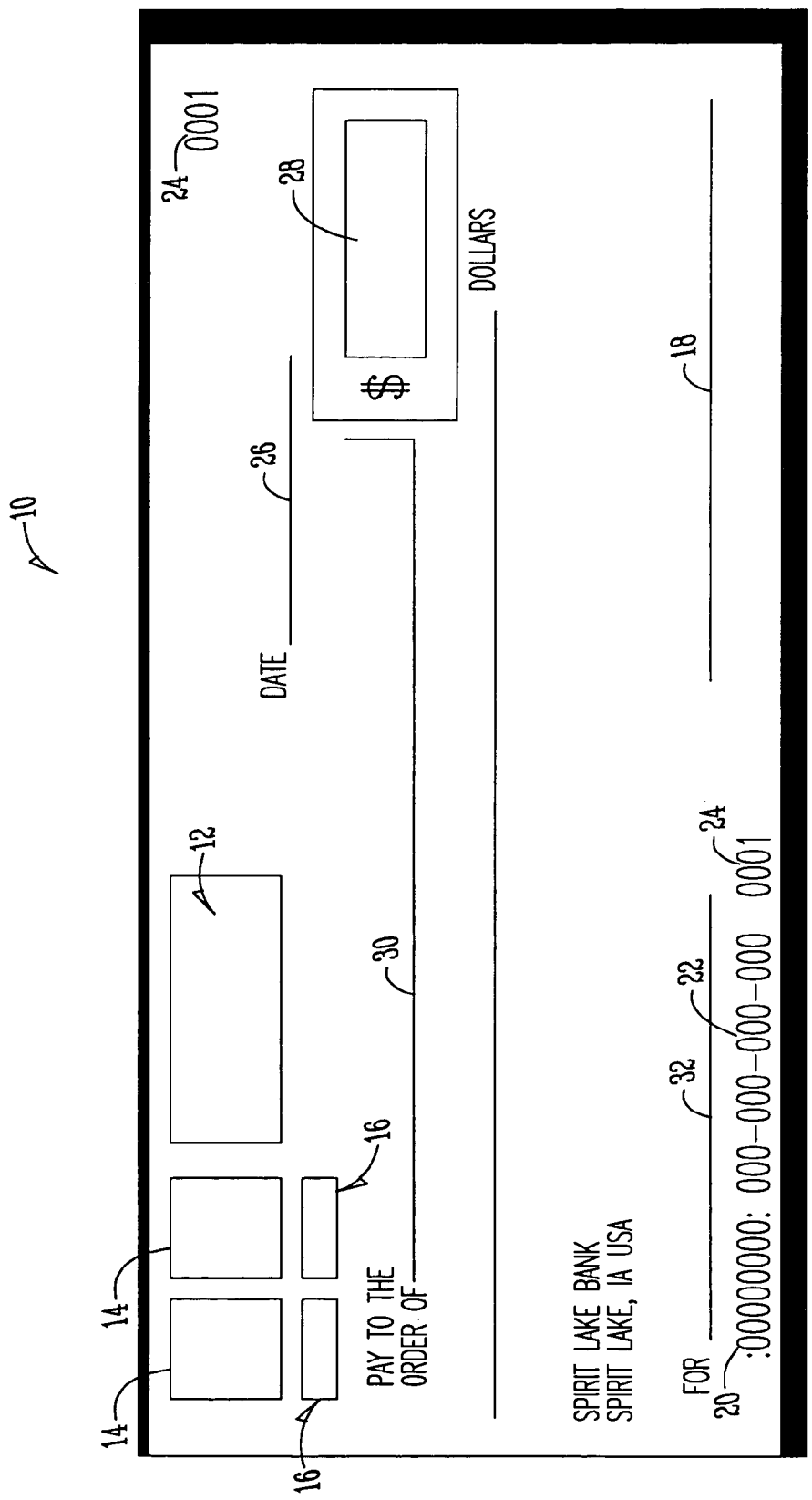
FIG. 1 is a top plan view of a check with fraud protection.

As seen in FIG. 1, a check with fraud protection is generally referred to by numeral 10. Although the term check is used, it is to be understood that checks are part of a broader class called negotiable instruments. Other negotiable instruments may be used interchangeably with the present invention including money orders and traveler's checks.

Figure 2:
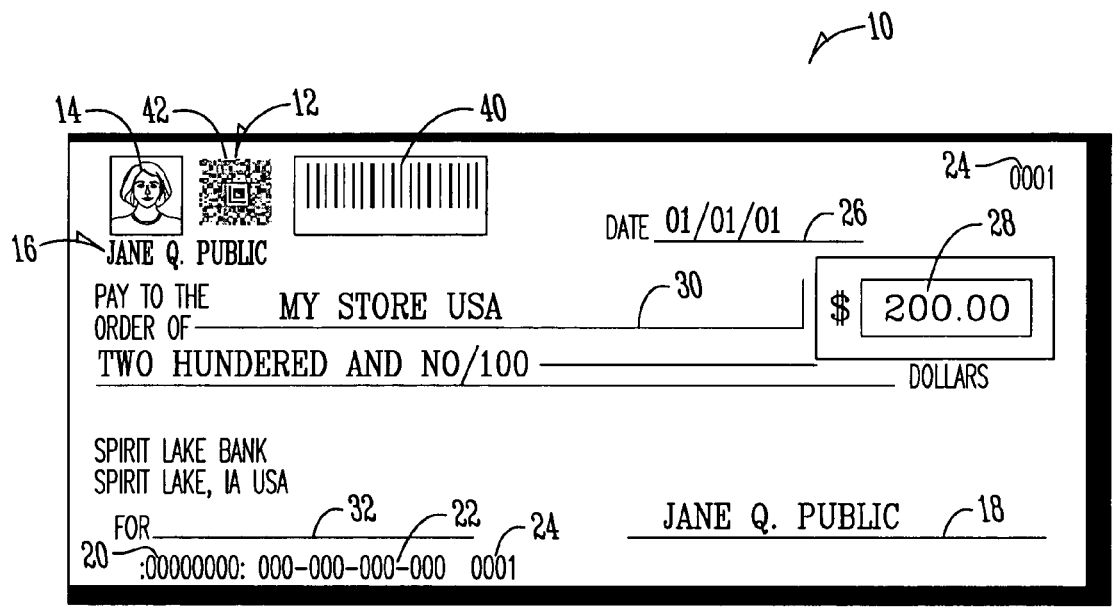
FIG. 2 is a top plan view of an example of a negotiable instrument with fraud protection.
Figure 3:
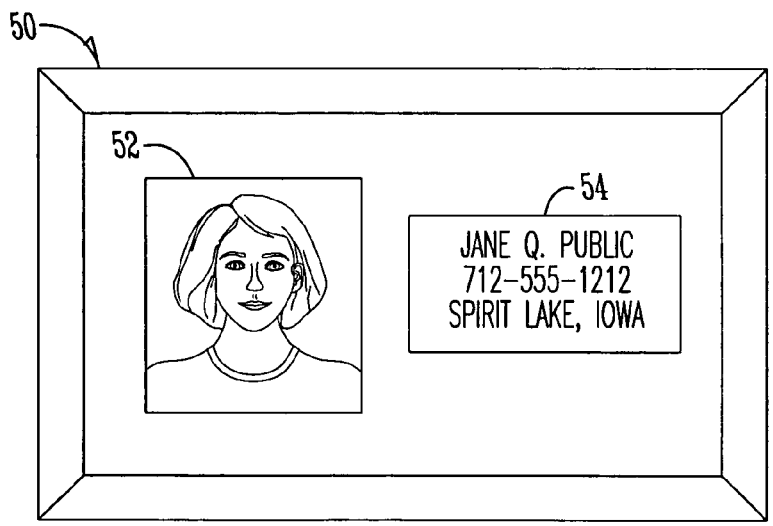
FIG. 3 is a front view of a computer screen displaying personal information hidden in the bar code regions of FIG. 2.

The check 10 has a bar code region 12. The bar code contains personal identification information including a valid check writer's home address and telephone number. Other personal information may be included in the bar code and include a pin number (secret number), social security number, telephone number, driver's license number, and password. As seen in FIG. 2, the bar code 12 may be either a one dimensional (1-D) or two dimensional (2-D) bar code. The 1-D bar code lends itself well to data which is alphanumerical characters. The 2-D bar code lends itself to both alpha numerical data as well as graphics data such as a photograph or a digital signature.

A 1-D bar codes may be of various types including, but not limited to, Universal Product Code (UPC), EAN, JAN or UPC code 128. A 1-D bar code can be read by an existing bar code scanner employed by the merchant (e.g. NCR 7880 or NCR 7835), and the merchant may not need to install additional scanning equipment. In addition, the 2-D system may be a PDF-417 and hold approximately 1,800 characters in the area the size of a postage stamp. It should be noted however, that there are other 2-D codes which would work equally as well.

The check also has a photo I.D. 14 of the user. The check may have two photographs for each person in a joint checking account or the check 10 may have a single picture of a person with only a single account holder. Under each photo identification 14 is a pre-printed signature.

The check also has other features common of negotiable instruments including a signature line 18, a bank routing number 20, an account number 22, a check number 24, a date line 26, an amount box 28, a payee 30, and a memo line. As seen in FIG. 2 the invention may have a 1-D bar code 40 or a 2-D bar code 42. The example shows a photo I.D. 14, a signature underneath the photo I.D. 16 matching the signature and signature line 18. When the merchant scans the check 10, a picture shows up on a computer screen 50 displaying the personal information hidden in bar code 12. The information may be a text display 54 and an image display 52.

Figure 4:
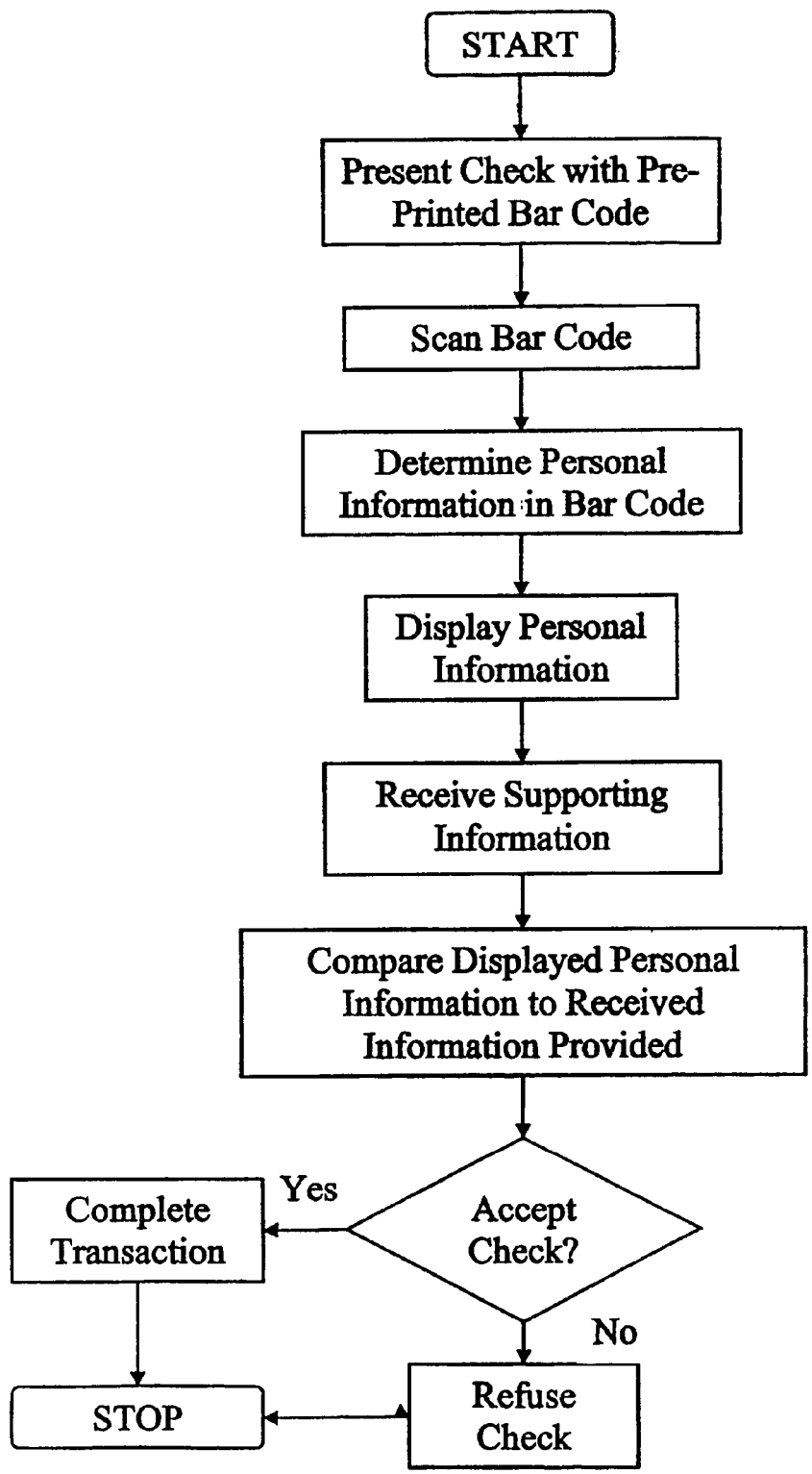
FIG. 4 is a flow chart of the method of the present invention.

The method of use is outlined in the flow chart as seen in FIG. 4. The check writer presents the check 10 with the pre-printed bar code 12 to a merchant. The merchant accepts the check 10 and notes that it contains a pre-printed bar code 10, a photo identification 14, and a pre-printed signature 16. The merchant then scans the check 10 to determine the personal identification information hidden within the bar code 12. The bar code scanner translates the information in the bar code 12 and then displays the personal information onto a computer display 50. If a 1-D bar code 40 is used then personal information is alphanumerical characters and will be shown on computer display 50 as text.

If a 2-D bar code 42 is read then such information such as a photo I.D. 52 will be displayed upon a computer display. The merchant having derived this information will then compare the personal identification information from the bar code 12 with the information provided by the writer. For example, the merchant can ask the writer what his/her home address would be and the user would have to provide the answer. The writer, if having fraudulently acquired the check, would not know the proper address hidden underneath the bar code.

In addition, the merchant compares the photo identification of the negotiable instrument 10 to the writer. Furthermore, the merchant would compare the pre-printed signature 16 upon the negotiable instrument 10 to a signature placed by the writer upon the negotiable instrument 10 at the signature line 18.

If the merchant's comparison raises any doubts as to the authenticity of the check writer, or the merchant suspects check fraud, the merchant will not accept the check 10 and refuse the check. If the merchant determines that the writer is not fraudulently writing the check then the merchant can complete the transaction.

It should be noted that this comparison is done without the need of any check validation programs in which the check must be electronically validated by a bank or other credit department. Therefore, this validation may be done in addition to other check validation programs which determines whether or not there is adequate funds in the bank account and may be done without adding any additional time to the validation programs that may be already in place with merchants. Also, the merchant may simply wish to accept the check if the merchant has recorded the persons identity and address in a database so that it would make it easier to contact the person if sufficient funds are not available and it is also possible to post the persons picture and name in a data base of people from whom checks are no longer accepted.

It should be apparent that various modes of carrying out the invention are contemplated, as are various modifications of the method and the negotiable instrument with fraud protection and that all of these fall within the scope of the invention if that the critical features of the invention outlined above are employed. Applicant intends to claim the widest scope of doctrine of equivalence allowed by current state of the law.

What is claimed is:

1. A method of using a negotiable instrument with protection to avoid acceptance of a fraudulent check at the point and time of transaction between a merchant and a check writer, the method comprising:

receiving a negotiable instrument having a pre-printed bar code from a check writer, a photo identification, and a pre-printed signature;

reading the bar code on the negotiable instrument at a point and time of the transaction between the merchant and the check writer and deriving personal identification information about the writer from the bar code;

comparing the personal identification information from the bar code with information provided by the check writer at the point and time of the transaction between the merchant and the check writer;

comparing the photo identification upon the negotiable instrument to the writer at the point and time of the transaction between the merchant and the check writer; and comparing the pre-printed signature upon the negotiable instrument to a signature placed by the writer upon the negotiable instrument at the point and time of the transaction between the merchant and the check writer;

determining by the merchant whether to accept or refuse the check at the point and time of transaction based on the steps of comparing the personal identification information from the bar code with the information provided by the check writer, comparing the photo identification upon the negotiable instrument to the writer, and comparing the pre-printed signature upon the negotiable instrument to the signature placed by the writer upon the negotiable instrument;

if the merchant determines to accept the check, processing the check to complete the transaction.

2. The method of claim 1 wherein the personal information is from the group consisting of: home address, pin number, social security number, telephone number, drivers license number, password, digital photograph, and signature.

3. The method of claim 1 wherein the personal information from the bar code comprises a home address and telephone number.

4. The method of claim 3 wherein the personal identification information from the bar code further comprises a digital photograph of the writer.

5. The method of claim 4 wherein the personal identification information from the bar code further comprises a digital image of the writers signature.

* * * * *